March 19, 1968  R. D. STEWART  3,373,876
ARTIFICIAL BODY ORGAN APPARATUS
Filed May 12, 1966
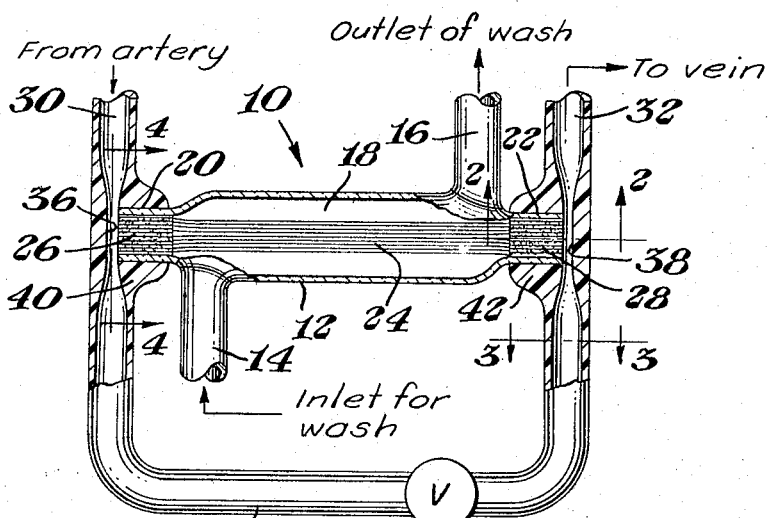
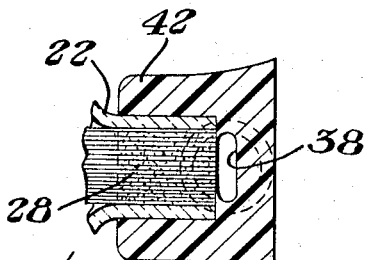
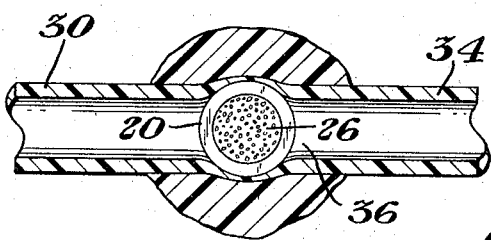
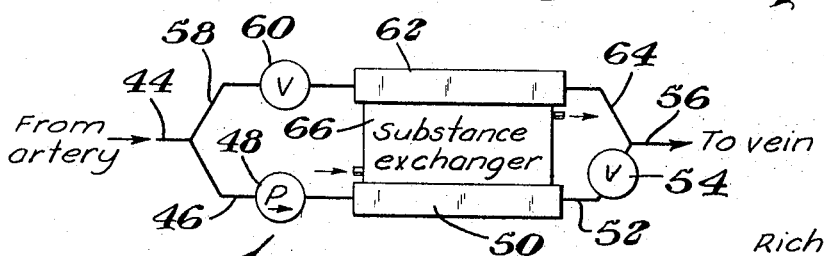
INVENTOR.
Richard D. Stewart
BY
Earl D. Ayers
AGENT

United States Patent Office 3,373,876
Patented Mar. 19, 1968

3,373,876
ARTIFICIAL BODY ORGAN APPARATUS
Richard D. Stewart, Midland, Mich., assignor to The Dow Chemical Company, Midland, Mich., a corporation of Delaware
Filed May 12, 1966, Ser. No. 549,662
4 Claims. (Cl. 210—321)

ABSTRACT OF THE DISCLOSURE

An artificial organ apparatus, such as a hollow fiber artificial kidney, including a substance exchanging element having an inlet and outlet for blood.

A header assembly coupled to the blood inlet and another header assembly coupled to the blood outlet, each header assembly having an input and output end and a transverse flow path intermediate of the input and output end and a Venturi flow path across the junction with the transverse flow path. The output end of one header is coupled to the input end of the other header. The input of one header is to be coupled to a source of blood and the output of the other header is coupled to blood return means.

---

This invention relates to artificial body organ apparatus and methods, and particularly to so-called artificial lung or kidney apparatus and the operation thereof.

Although apparatus in various forms has been devised whereby blood is passed through substance exchange devices in order to remove unwanted substances therefrom and/or add wanted substances thereto, difficulty has been encountered in preventing clotting of the blood at the entry to and/or exit from what may be termed the "substance exchange" part of the apparatus.

Such clotting is the result of coagulation which occurs when blood is brought into contact with a foreign substance. The platelets in the blood stream, upon contacting a foreign surface such as a plastic or cellulose membrane, adhere to this surface as if to form a protective layer over it, i.e., protective from the standpoint of the other blood constituents. The so-called "foreign" surface is solidly coated with the platelets, which adhere to each other, and in a short period of time, by dissolving the cell wall between the platelets, becomes one adhesive mass. While this act of platelet coating is going on, chemicals liberated by the platelets cause the prothrombin in the blood, a soluble protein complex, to be converted to thrombin. The thrombin in turn acts upon another soluble protein complex in the blood, fibrinogen, converting this to the insoluble fibrin which is deposited in strands over the foreign surface or the platelet mass. The fibrin mesh plus the platelet conglomeration trap other cellular elements and eventually the blood clot is formed.

The onset of blood clotting can be delayed by adding substances such as heparin or dicumarol, for example, to the blood stream. However, even with the use of such coagulation inhibitors, the duration of usefulness of artificial organ devices has been limited because of the formation of these very troublesome clots at the inlet and outlet ends of the "substance exchange" part or parts of the apparatus.

Accordingly, a principal object of this invention is to provide improved artificial organ apparatus.

Another object of this invention is to provide an artificial body organ apparatus which has improved liquid flow-through characteristics.

A further object of this invention is to provide improved, more effective blood clot preventing inlet and outlet flow apparatus for use with artificial body organ apparatus.

Yet another object of this invention is to provide improved, more economical and simpler artificial body organ apparatus.

A still further object of this invention is to provide an improved method of operating an artificial body organ.

An additional object of this invention is to provide an improved method of reducing blood clotting tendencies at the entrance(s) to or exit(s) from parts of artificial organs where a foreign substance is encountered in the flow of blood therethrough.

In accordance with this invention there is provided an artificial organ apparatus including a substance exchanging element having an inlet and outlet for blood, such as a hollow fiber artificial kidney unit, for example. A header assembly is coupled to the inlet for blood and another header assembly is coupled to the outlet for blood. Each header assembly has an input and output end and a transverse flow path intermediate of the input and output end. A Venturi flow path is provided across the junction with the transverse flow path. The output end of one header is coupled to the input end of the other header. The input of one header is to be coupled to a source of blood and the output of the other header is coupled to blood return means (such as a vein, for example). The part of the inlet tube which is adapted to be coupled to a source of blood and the part of the outlet tube which is adapted to be coupled to a blood receiving element are one side of said reduced cross sectional configuration in said tubes and the interconnection between the inlet and outlet flow tubes is to the other side of said reduced cross sectional configuration parts in said tubes.

Means are provided for controlling the flow of blood through said interconnection between the inlet and outlet tubes.

The invention, as well as additional objects and advantages thereof, will best be understood when the following detailed description is read in connection with the accompanying drawing, in which:

FIG. 1 is a side elevational view, partly in section, of apparatus in accordance with this invention;

FIG. 2 is a sectional view taken along the line 2—2 of FIG. 1;

FIG. 3 is a sectional view taken along the line 3—3 of FIG. 1;

FIG. 4 is a sectional view taken along the line 4—4 of FIG. 1, and

FIG. 5 is a diagrammatical view of a so-called double by-pass embodiment of this invention.

Referring to the drawing, there is shown artificial body organ apparatus, indicated generally by the numeral 10, which includes a body part 12, shown as a flared glass tube having ends 20, 22 of smaller diameter than the diameter of the rest of the body part, and having a wash inlet 14 and outlet 16 coupled, at spaced apart intervals, to the part of said body lying between the ends 20, 22.

An elongated bundle 24 of hollow fibers has its ends potted with a silastic compound or an epoxy resin compound at the ends 20, 22, the ends of each fiber being generally at or near the extremity of the ends 20, 22.

The potting, as at 26, 28 of the ends of the fiber bundle leaves the open ends of the fibers exposed, but provides a liquid proof seal between the fibers and the ends 20, 22 of the body part.

A blood inlet tube 30, usually made of a so-called silastic compound, for example, is coupled to the inlet end 20 of the body part 12 by means of a molded header 40.

The header 40 is likewise coupled at its output end, to a by-pass tube 34 which is coupled to the input end of a header 42 which is similar if not identical to the header 40. The output of the header 42 is coupled to an outlet tube 32, for example.

The inlet tube 30 is commonly coupled to an artery (not shown) while the outlet tube 32 is commonly coupled to a vein.

The headers 40, 42 are conveniently made by flattening a section of tubing, like the tubing 30, or 34, for example, to the configuration shown at 36 in FIG. 2, cutting a hole shaped to fit around, or at least so it is exposed to, the open end of the 20 or 22 of the body part 12. The flattened tube is then aligned with and against the open end of the body part 12, and held in that position while the molding sets about the flattened tube and about the end of the body part 12.

As is seen in FIG. 2, the headers 40, 42 provide a flattened tube of reduced cross sectional configuration as compared with the normal round cross sectional configuration of the tube 34 (usually the same diameter as the diameter of the tube 30) as shown in FIG. 3, with the top of the inner wall of the flattened tubing being aligned with, or slightly below, the extremities of the fiber bundle ends 26, 28. The headers also provide a liquid tight coupling between the tubing 30, 32 34 and the ends 20, 22 of the body section 12.

The inlet 14 is coupled to a wash solution (dialisate when the organ apparatus 10 is used as a kidney) which, for use as a kidney, is essentially a physiological saline solution to which is added inorganic salts and possibly urea in controlled quantities. If the artificial organ apparatus is to be used as a lung, the wash solution would be, for example, air or oxygen or a specific desired mixture of oxygen and other gases.

In operation, with the tube 30 coupled to an artery (not shown) with the tube 32 coupled to a vein in any suitable manner, the tube 34 is pinched by a suitable means (not shown), such as an adjustable clamp, for example, to adjust the pressure differential across the by-pass tube 34 to cause blood to flow from the tube 30 through the fiber bundle 24 and into the tube 32, thence into a vein (not shown).

The blood flow channel in the headers 40, 42 is such that the blood has access to the open ends of the fibers in the bundle 24 plus flows, in each case, past the ends of the bundle 24 at a higher velocity than is usual if no special by-pass assembly (tube 34 plus headers 40, 42) is used.

The higher velocity of blood flow more or less tangentially past the open ends of the fibers of the bundle 24, sweeps most of the platelets which tend to deposit on the entry and exit ends of the fiber bundle 24 past the bundle ends, thereby substantially slowing the formation of blood clots and thereby prolonging the useful operating life of the apparatus.

The slowing of the formation of blood clots at the input and output ends of the fiber bundles also slows clogging of the fine fibers of the bundle, because there are relatively fewer platelet agglomerations which break loose and tend to flow through the fibers. In addition, loosened agglomerations of platelets and other clotting elements tend to flow through the by-pass tube 34 rather than through the fiber bundle 24.

Referring to FIG. 5, there is shown an alternative embodiment of this invention, a so-called double by-pass type artificial body organ apparatus.

In the double by-pass embodiment, a tube 44 from an artery is split (by a Y connector, for example) into a branch tube 46 having a suitable positive displacement pump 48 coupled thereto the input of a header 50 (like header 40 in FIG. 1). The other (output) end of the header 50 is coupled to a by-pass tube 52 having a valve or other suitable flow control means therein, and thence to a tube 56 which may be coupled to a vein or other suitable blood receivable means.

The other branch tube 58, coupled to the arterial tube 44, is coupled to the input of a header 62 (like header 42) through a valve or other flow control means 60. The output of the header 62 is coupled through a branch tube 64 into the tube 56 (as is tube 52).

The substance exchanger 66, may, for example, be of the type shown in FIG. 1, for example, including a body part containing a fiber bundle, means for flowing a wash material past and around the fiber bundle therein, and inlet and outlet means for the blood flow path through the bundle of fibers.

In operation, the pressure of the blood entering the header 50 may be adjusted by means of the pump 48 and valve 54 in line 52. The pressure and flow rate are adjusted to provide a reasonable flow of blood through the substance exchanger 66 while controlling the blood flow through the by-pass tube 52 to reasonable limits which will provide the flow through and across the header 50 to sweep into the tube 52 most of the platelets and/or other clotting "aids" tending to deposit on the fiber bundle end as blood flows through the fiber bundle of the substance exchanger.

The valve or flow control means 60 in the tube 58 is adjusted to with respect to the pump 48 and valve 54, to balance the blood flow through the tube 52 and across the header 62 whereby the velocity of blood flow through and across the header 62 is sufficient to sweep away from the fiber bundle end as many as practicable of the platelets and other clotting "aids" which tend to deposit there.

Because of the normally higher arterial pressure, the sweeping of the platelets, etc., from the header 62 may be accomplished easier in some situations than when the embodiment of FIG. 1 is used.

In the fiber tube bundle 24, for example, the fibers may be made of a cellophane-like material having an inside diameter of 50 to 400 microns and a wall thickness of from 10 to 40 microns. While the cellophane-like fibers are well suited for use in artificial kidneys, for example, silastic fibers are often better for use in artificial lungs. The size and type of fibers will be known to those skilled in the art of manufacturing and/or using artificial body organs.

What is claimed is:
1. Artificial body organ apparatus comprising:
   (a) a substance exchange part having a blood inlet and outlet tube;
   (b) a pair of header assemblies, each assembly having an elongated tubular flow path including outer and inner walls, input end, an output end, and a central part which has an inner wall of reduced transverse cross sectional configuration with respect to the transverse cross sectional configuration of the inner wall of said input and output ends, and a transversely disposed enclosed output flow path coupled to said central part, said last mentioned flow path being adapted to be coupled to one of said tubes of said substance exchange part, one transversely disposed output flow path of one header being coupled to said inlet tube of said substance exchange part, the transversely disposed output flow path of the other header being coupled to said outlet tube of said substance exchange part;
   (c) a by-pass tube, said by-pass tube being coupled to the first mentioned output end of one header and the input end of said other header;
   (d) means for coupling a blood stream under pressure to the input end of the header whose aligned output end is coupled to said by-pass tube, and
   (e) means for withdrawing blood from the aligned output end of said header whose input end is coupled to said by-pass tube.

2. Apparatus in accordance with claim 1, wherein the extremities of said inlet and outlet tubes of said substance exchange part are substantially flush with the inner wall of the central part of the flow path of the header to which they are coupled.

3. Apparatus in accordance with claim 1, wherein said central part of said flow path has a flattened cross sectional configuration with generally parallel spaced apart inner walls, and each tube of said substance exchange part extends at least close to one of said flat inner walls of the header to which it is coupled.

4. Apparatus in accordance with claim 1, wherein means are provided for controlling the flow of blood through said by-pass tube.

References Cited

UNITED STATES PATENTS

| | | | |
|---|---|---|---|
| 550,583 | 12/1895 | Brinckman et al. | 210—409 X |
| 2,407,190 | 9/1946 | Tait | 210—416 |
| 3,211,645 | 10/1965 | Ferrari | 210—22 |
| 3,228,876 | 1/1966 | Mahon | 210—22 |

OTHER REFERENCES

De Wall et al.: "The Helix Reservoir Pump-Oxygenator," from Surgery, Gynecology and Obstetrics, vol. 104, No. 6, June 1957, pp. 702 and 703 relied on (from pp. 699 to 710). Published by The Franklin H. Martin Memorial Foundation, 55 E. Erie St., Chicago, Ill. 60611.

REUBEN FRIEDMAN, *Primary Examiner.*

F. SPEAR, *Assistant Examiner.*